United States Patent
Dow et al.

(10) Patent No.: US 8,972,422 B2
(45) Date of Patent: Mar. 3, 2015

(54) MANAGEMENT OF LOG DATA IN A NETWORKED SYSTEM

(71) Applicant: International Business Machines Corporation, Armonk, NY (US)

(72) Inventors: Eli M. Dow, Norwood, NY (US); Erin M. Farr, Fishkill, NY (US); Douglas M. Zobre, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/088,704

(22) Filed: Nov. 25, 2013

(65) Prior Publication Data

US 2014/0081999 A1  Mar. 20, 2014

Related U.S. Application Data

(63) Continuation of application No. 13/447,500, filed on Apr. 16, 2012, now abandoned.

(51) Int. Cl.
*G06F 17/30* (2006.01)
*G06Q 10/06* (2012.01)

(52) U.S. Cl.
CPC .......... *G06F 17/30699* (2013.01); *G06Q 10/06* (2013.01)
USPC ........... 707/754; 707/736; 714/100; 709/225; 706/45; 706/62

(58) Field of Classification Search
None
See application file for complete search history.

(56) References Cited

U.S. PATENT DOCUMENTS

| 5,546,503 | A | 8/1996 | Abe et al. |
| 5,966,708 | A * | 10/1999 | Clark et al. ........................... 1/1 |
| 6,216,048 | B1 | 4/2001 | Keeler et al. |
| 7,356,331 | B2 * | 4/2008 | Lee et al. ................... 455/412.1 |
| 7,653,718 | B2 | 1/2010 | Josyula et al. |
| 7,653,836 | B1 | 1/2010 | Chatterjee et al. |
| 8,073,806 | B2 | 12/2011 | Garg et al. |
| 2008/0319940 | A1 | 12/2008 | Garg et al. |
| 2010/0023867 | A1 | 1/2010 | Coldiron et al. |
| 2010/0332540 | A1 | 12/2010 | Moerchen et al. |
| 2011/0083123 | A1 * | 4/2011 | Lou et al. ...................... 717/125 |
| 2011/0185234 | A1 | 7/2011 | Cohen et al. |
| 2012/0159256 | A1 * | 6/2012 | Havewala et al. ............... 714/37 |
| 2013/0151909 | A1 * | 6/2013 | Kikuchi ......................... 714/54 |

* cited by examiner

*Primary Examiner* — Hung Le
(74) *Attorney, Agent, or Firm* — Cantor Colburn LLP; Steven Chiu

(57) ABSTRACT

A method for managing log messages in a system includes identifying a log message having a data value, filtering a first data value from a historical log record for a first interval, predicting whether any particular system events should occur when the first data value is filtered from a received log record and identifying the corresponding system events, initiating a second interval while filtering the first data value from a received log record, determining whether any non-predicted system events have occurred, and removing the filter for the first data value responsive to determining that a non-predicted system event has occurred.

13 Claims, 3 Drawing Sheets

MANAGEMENT OF LOG DATA IN A NETWORKED SYSTEM

CROSS-REFERENCE TO RELATED APPLICATIONS AND PRIORITY CLAIM

This application is a continuation of and claims priority from U.S. patent application Ser. No. 13/447,500, filed on Apr. 16, 2012, entitled "MANAGEMENT OF LOG DATA IN A NETWORKED SYSTEM", the entire contents of which are incorporated herein by reference.

BACKGROUND

The present disclosure relates to the field of computer data storage systems, and more specifically, to systems, methods and computer program products for storing log data in a networked storage system.

Many computer applications and operating systems produce log data during for tracking the use and performance of the application or system. This log data is stored by the computer system and can be analyzed to gather information about the performance of the program or system. In a large system that can include multiple systems running multiple applications that are all generating log data, the management, transmission and storage of the log data can consume valuable system resources.

In many current systems, a data logger is used to provide data logging for applications running in a single-system or multi-system sysplex. The data logger manages the tasks of saving the log data, retrieving the data and archiving the data. The data logger provides a single, merged, log, containing log data from multiple instances of an application within the sysplex. Log data managed by the logger may reside in multiple physical locations. The data logger utilizes standard networking infrastructure and protocols to manage the location of the data and the migration of that data from one location to another. As a result, multiple copies of the log stream data may be generated which can decrease system performance. In addition, the standard network protocols used by the data logger incur substantial overhead providing a quality of service not required by the data logger.

SUMMARY

According to one embodiment of the present invention, a method for managing log messages in a system includes identifying a log message having a data value, filtering a first data value from a historical log record for a first interval, predicting whether any particular system events should occur when the first data value is filtered from a received log record and identifying the corresponding system events, initiating a second interval while filtering the first data value from a received log record, determining whether any non-predicted system events have occurred, and removing the filter for the first data value responsive to determining that a non-predicted system event has occurred.

According to another embodiment of the present invention, a computer system for manage log messages includes a processor that is operative to identify a log message having a data value, filter a first data value from a historical log record for a first interval, predict whether any particular system events should occur when the first data value is filtered from a received log record and identifying the corresponding system events, initiate a second interval while filtering the first data value from a received log record, determine whether any non-predicted system events have occurred, and remove the filter for the data value responsive to determining that a non-predicted system event has occurred.

According to yet another embodiment of the present invention, a computer program product for managing log records includes a tangible storage medium readable by a processing circuit and storing instructions for execution by the processing circuit for performing a method comprising identifying a log message having a data value, filtering a first data value from a historical log record for a first interval, predicting whether any particular system events should occur when the first data value is filtered from a received log record and identifying the corresponding system events, initiating a second interval while filtering the first data value from a received log record, determining whether any non-predicted system events have occurred, and removing the filter for the data value responsive to determining that a non-predicted system event has occurred.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
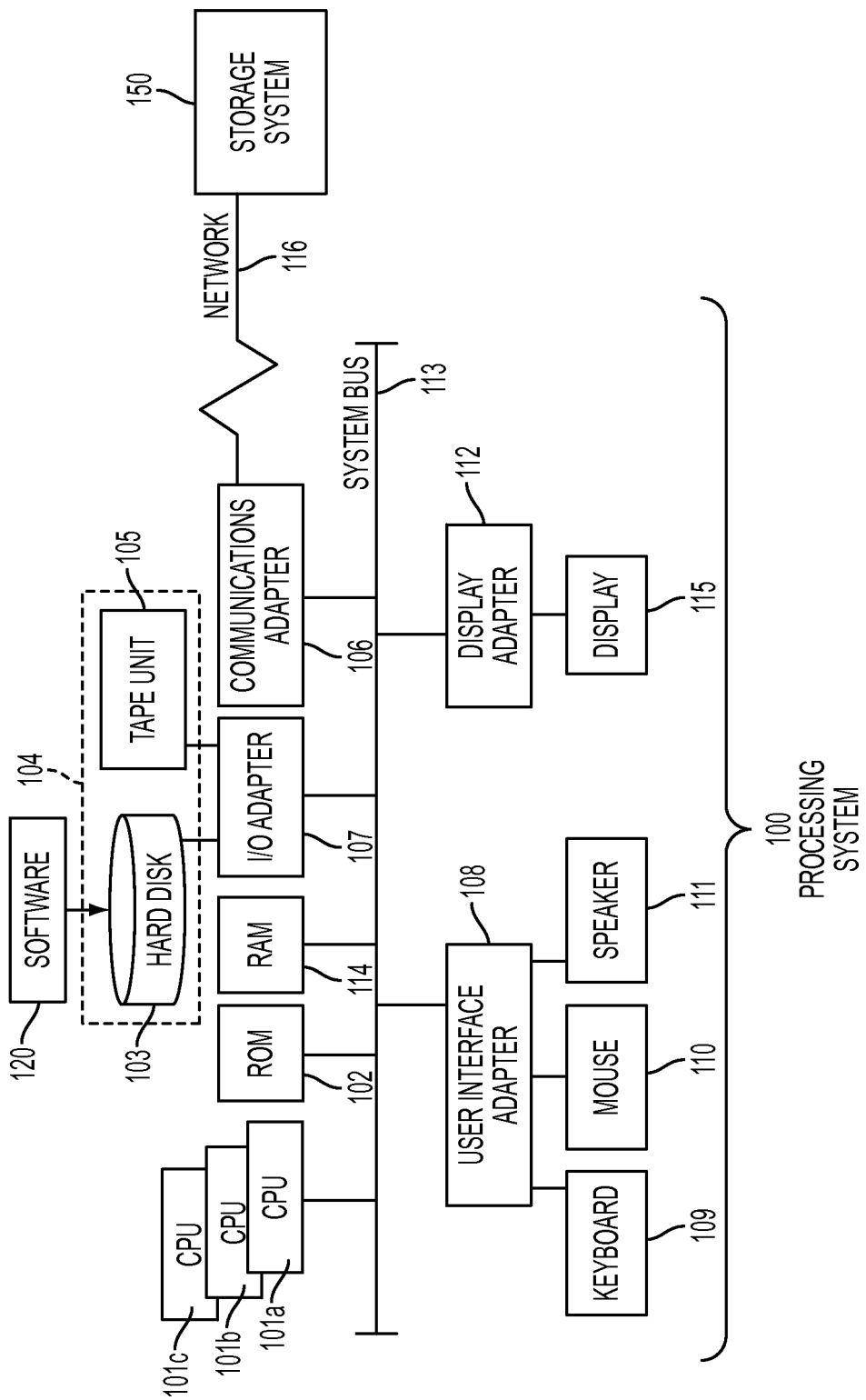
FIG. 1 is a block diagram illustrating a processing system and a storage system in accordance with an exemplary embodiment of the disclosure.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network or communications adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Software 120 for execution on the processing system 100 may be stored in mass storage 104. A network adapter 106 interconnects bus 113 with an outside network 116 enabling data processing system 100 to communicate with one or more storage systems 150. The storage system 150 may include any type of processing system that is used to store or analyze data provided by the processing system 100. Accordingly, the storage system 150 may also include one or more central processing units, a system memory, a communications adapter and other components similar to those present in the processing system 100.

A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

In current data logging systems, as log data is written into a log stream, the log data is buffered, or copied, into one or more storage locations and these buffers are later processed by having the log data copied and sent over the network.

The log data that is written into a log stream as described above may include, for example, a log message having a unique message identifier, lineage data that indicates, for example, whether the message is a copy of another message, message payload that includes log data, a size parameter that indicates the size of the log message, an identifier of the message generating entity, a time stamp, and an identifier of the user permissions granted by the entity that generated the log message.

As discussed above, the log stream may become significantly large and may include hundreds of messages generated per second of operation. The volume and flow rate of messages may undesirably consume system processing and communications resources. Thus, it is desirable to identify log messages that may not be necessary for operation, troubleshooting, or analytical purposes, and in some instances, filter, instruct a log generating entity to cease sending unnecessary log messages, or instruct the log generating entity to send messages to a particular recipient or group of recipients.

Figure 2:
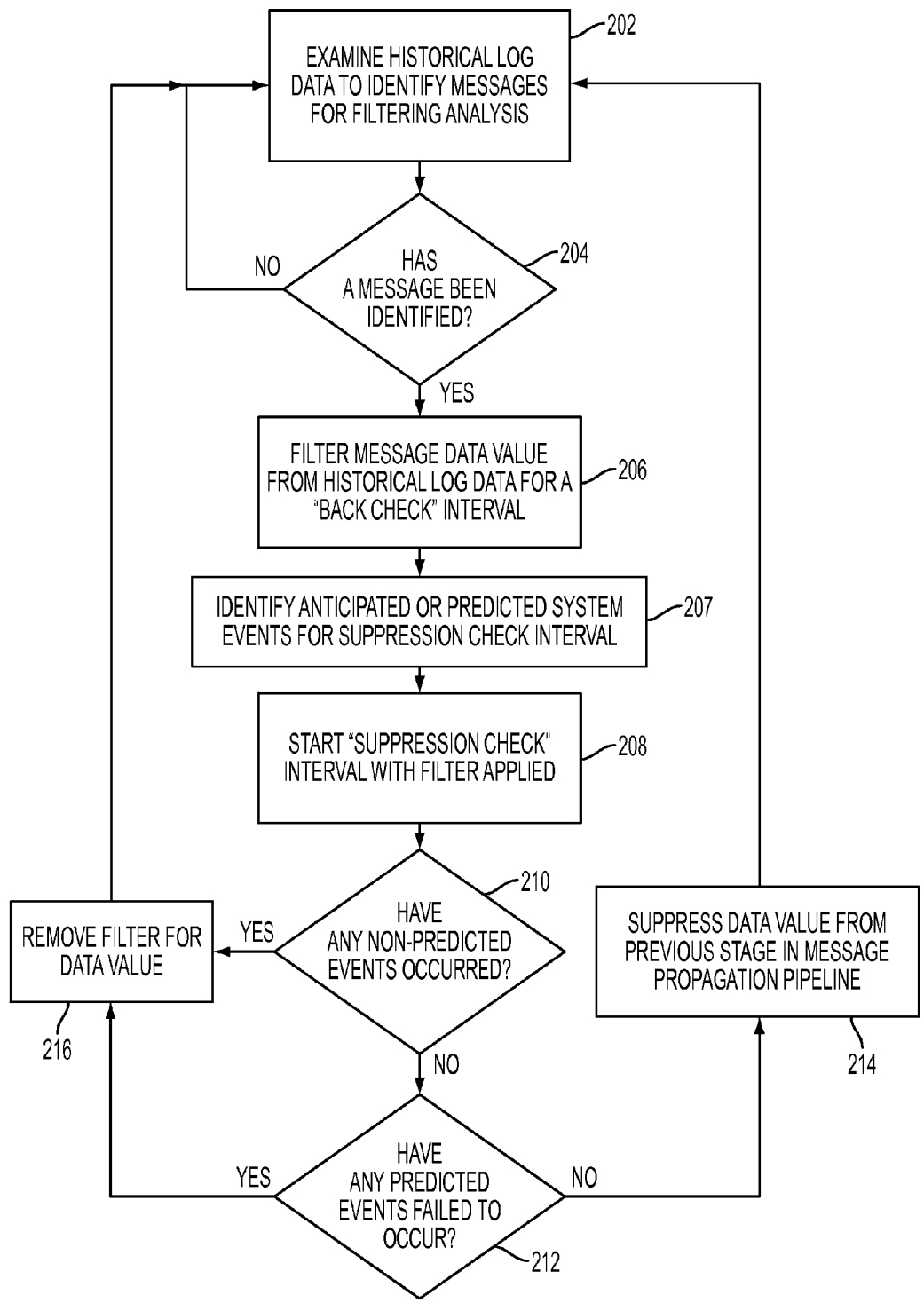
FIG. 2 illustrates a block diagram of an exemplary method for managing log messages the system of FIG. 1.

In this regard, FIG. 2 illustrates a block diagram of an exemplary method for managing log messages in a system. In block 202, the historical log of data may be examined to identify messages for filtering analysis. For example, the historical message stream (i.e., historical log data) includes log message data. The log message data may be analyzed to identify particular messages or data values in messages that may be further analyzed to determine whether the data values may be suppressed. If a message or data value from a message has been identified in block 204, the message data value is filtered from the historical log data for a "back check" interval in block 206. The back check interval is a programmatically or user defined time interval. In block 207, prior to the initiation of the suppression check interval (described below), the data value is analyzed to predict which system events are anticipated or predicted to occur during the suppression check interval. For example, the analysis may include identifying a previously seen message that occurs in the system that correlates highly with a subsequent appearance of one or more other messages (e.g., a configuration complete message or a cluster quorum message following a configuration started message or a cluster voting message respectively). In another example, a lack of a specific expected message may indicate the expectation of subsequent messages (e.g., error condition messages regarding time-outs if a configuration message has been identified, but no configuration complete message was identified in the learned interval of expectation). Predicted or anticipated system events may either be experiences (i.e., learned) or previously defined message pattern analysis algorithms that have the capability of identifying messages as noise. For example, code that defines normal operation of a system may include one or more thresholds that may be used to identify a message(s) as "noise" and not relevant for analysis (i.e., may be discarded). In block 208, a suppression check interval is started with the filter applied such that the message data value is removed from the log message data. In block 210 the system determines whether any non-predicted events have occurred. In this regard, a non-predicted event may include any event occurring in the system that was not anticipated as a result of the application of the filter. If yes, the filter for the data value is removed in block 216. If no, the system determines whether any predicted or anticipated events have failed to occur in block 212. If yes, than the filter for the data value is removed in block 216. If no, than the data value is suppressed from a previous stage in the message propagation pipeline in block 214.

Figure 3:
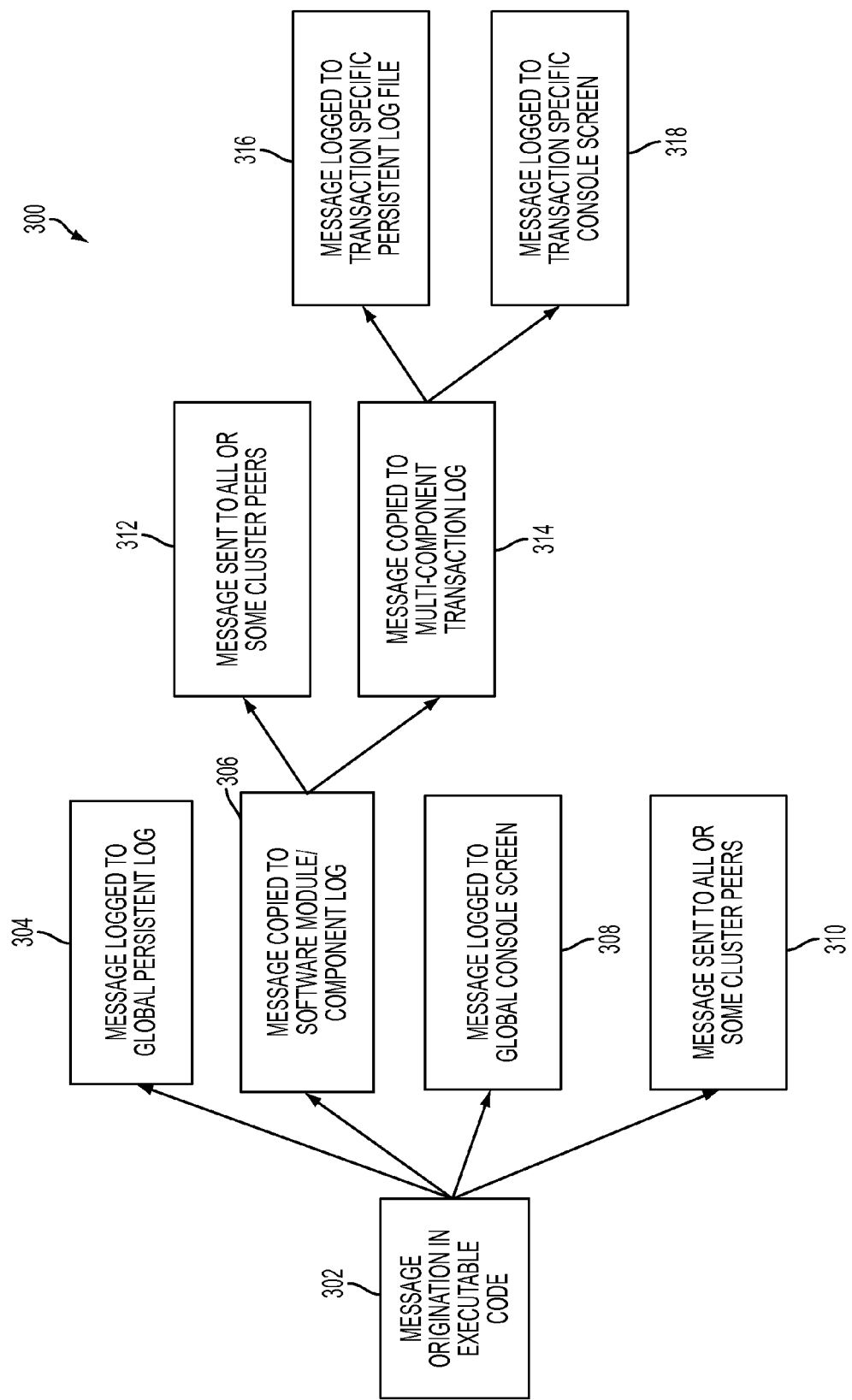
FIG. 3 illustrates a block diagram of an example of a message propagation pipeline of the system of FIG. 1.

FIG. 3 illustrates a block diagram of an example of a message propagation pipeline 300. The pipeline 300 includes the origination of a log message with data values in executable code in block 302. Once the message has been originated, the message may be sent to one or all of the pipeline paths. In block 304, the message may be logged into a global persistent log, which for example, receives all or most of the messages originated in the system and logs the messages into a global log. The message may be copied into a software module or component log, which may include for example a log associated with a particular software module or component of the system. In block 308, the message may be logged to a global console screen, which may include for example, a display that is operative to display log messages for the system to a user. In block 310, the message may be sent one or more cluster peers of the system. Cluster bears include any nodes acting in concert with the system such as, for example, nodes that adhere to the specifications of the processing system of FIG. 1. Peers include elements of a distributed application architecture that participate in collaborative workload processing, generally by fulfilling a task (e.g., a partitioned task) from a superset of work to be completed. In general, peers include equally privileged, "equipotent" participants in the computational nodes that form a peer-to-peer network of nodes. Once the message is copied to a software module or component log in block 306, the message may be sent one or more of the cluster peers in block 312, and/or may be copied to a multi-component transaction log in block 314. A multi-component transaction log may include log messages associated with a number of different system transactions. In block 316, the message may be logged to a transaction specific persistent log file that is associated with a particular transaction, and in block 318, the message may be logged to a transaction specific console screen for display to a user.

The blocks of the message propagation pipeline described above in FIG. 3 represent one or more nodes that have propagated the message with the data value. Suppression of the data value may include, for example, using a program to issue a message suppression command for the particular message from the source of the message, configuring an application to no longer issue the message or similar types of messages, and/or changing a function or setting for consoles in the system. Thus, once the suppression of a data value has been determined to not adversely affect the operation of the system (e.g., by filtering the data value for the suppression check interval, and determining that non-predicted events have not occurred, and no predicted or anticipated events have not failed to occur), message may be suppressed the previous stage or node in the message propagation pipeline. Following the suppression of the message in the previous stage or node, the above described process may be repeated with a similar or the same data value to determine if the data value may be suppressed in yet another previous stage or node. Alternatively a new data value may be identified and processed in a similar manner.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for managing log messages in a system, the method comprising:
    identifying a log message having a data value;
    filtering a first data value from a historical log record for a first interval;
    predicting whether any particular system events should occur when the first data value is filtered from a received log record and identifying the corresponding system events;
    initiating a second interval while filtering the first data value from a received log record;
    determining whether any non-predicted system events have occurred; and
    removing the filter for the first data value responsive to determining that a non-predicted system event has occurred.

2. The method of claim 1, further comprising:
    determining whether any predicted system events have not occurred responsive to determining that a non-predicted system event has not occurred; and
    removing the filter for the data value responsive to determining that a predicted system events has not occurred.

3. The method of claim 2, further comprising suppressing the data value from a stage in the message propagation pipeline responsive to determining that no predicted system events have not occurred.

4. The method of claim 3, wherein the suppressing the data value from a stage in the message propagation pipeline includes modifying a portion of executable code that originated the log message having the data value to cease sending log messages having the data value.

5. The method of claim 3, wherein the suppressing the data value from a stage in the message propagation pipeline includes issuing a command to an application that originated the log message having the data value to cease sending log messages having the data value.

6. The method of claim 3, wherein the suppressing the data value from a stage in the message propagation pipeline includes issuing a command to a console to cease displaying log messages having the data value.

7. The method of claim 1, wherein the first data value is associated with a log message.

8. A computer program product for managing log records, the computer program product comprising:
    a non-transitory tangible storage medium readable by a processing circuit and storing instructions for execution by the processing circuit for performing a method comprising:
    identifying a log message having a data value;
    filtering a first data value from a historical log record for a first interval;
    predicting whether any particular system events should occur when the first data value is filtered from a received log record and identifying the corresponding system events;
    initiating a second interval while filtering the first data value from a received log record;
    determining whether any non-predicted system events have occurred; and
    removing the filter for the data value responsive to determining that a non-predicted system event has occurred.

9. The computer program product of claim 8, wherein the method further comprises:
    determining whether any predicted system events have not occurred responsive to determining that a non-predicted system event has not occurred; and
    removing the filter for the data value responsive to determining that a predicted system events has not occurred.

10. The computer program product of claim 9, wherein the method further comprises suppressing the data value from a stage in the message propagation pipeline responsive to determining that no predicted system events have not occurred.

11. The computer program product of claim 10, wherein the suppressing the data value from a stage in the message propagation pipeline includes modifying a portion of executable code that originated the log message having the data value to cease sending log messages having the data value.

12. The computer program product of claim 10, wherein the suppressing the data value from a stage in the message propagation pipeline includes issuing a command to an application that originated the log message having the data value to cease sending log messages having the data value.

13. The computer program product of claim 10, wherein the suppressing the data value from a stage in the message propagation pipeline includes issuing a command to a console to cease displaying log messages having the data value.

* * * * *